United States Patent
Abadi et al.

(10) Patent No.: US 6,253,370 B1
(45) Date of Patent: *Jun. 26, 2001

(54) METHOD AND APPARATUS FOR ANNOTATING A COMPUTER PROGRAM TO FACILITATE SUBSEQUENT PROCESSING OF THE PROGRAM

(75) Inventors: Martin Abadi, Palo Alto; Sanjay Ghemawat, Mountain View; Raymond Paul Stata, Palo Alto, all of CA (US)

(73) Assignee: Compaq Computer Corporation, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/982,088

(22) Filed: Dec. 1, 1997

(51) Int. Cl.$^7$ .................................................. G06F 9/445
(52) U.S. Cl. ..................... 717/5; 717/2; 717/9; 713/182; 713/200
(58) Field of Search .................................. 395/705, 709; 717/5, 9, 2; 713/20 D, 182

(56) References Cited

U.S. PATENT DOCUMENTS 5,418,958 * 5/1995 Goebel .................................. 395/709
5,734,822 * 3/1998 Houha et al. ...................... 395/200.6

OTHER PUBLICATIONS

Necular et al., "The Design and Implementation of a Certifying Compiler", ACM, pp. 333–344, Jun. 1998.*
Myers, "JFlow: Practical Mostly-Static Information Flow Control", ACM, pp. 228–241, Jan. 1999.*
Thorn, "Programming Language for Mobile Code", ACM Computing Surveys, vol. 29, No. 3, pp. 213–239, Sep. 1997.*
Aho et a., "Compilers, Principles, Techniques, and Tools", Addison–Wesley, pp. 10–15, 396–400, 517–518, 528–533, Mar. 1988.*
George C. Necula and Peter Lee, "Proof–Carrying Code," CMU–CS–96–165.
Peter Lee's Web Page: http://www.cscmu.edu/~petel/papers/pcc/, "Proof–Carry Code," printed Nov. 26, 1997.
Peter Lee and George C. Necula, "Research on Proof–Carrying Code for Mobile–Code Security," DARPA Workshop on Foundations for Secure Mobile Code, Mar. 26–27, 1997.
The ANDF Home Page: http://www.osf.org/andf/, "A Brief Introduction to ANDF", printed Oct. 1, 1997.

* cited by examiner

Primary Examiner—Mark R. Powell
Assistant Examiner—Ted. T. Vo
(74) Attorney, Agent, or Firm—Cesari and McKenna, LLP; Edwin H. Paul

(57) ABSTRACT

A method and apparatus annotates a computer program to facilitate subsequent processing of the program. Code representing the program is generated at a first computer system. Annotations are generated for the code that provide information about the code. At a second computer, the code is processed according to the information provided by the annotations. The annotations, for example, can indicate a control flow graph representing a flow of execution of the code. Also, the information provided by the annotations can be a register allocation that maps data structures of the code to registers of the second computer system. The second computer system can use such information to guide the interpreting of the code or to transform the code into a more optimized form. Other exemplary annotations can indicate that running the executable form of the code would perform an unauthorized operation at the second computer system. The second computer system could then reject the code instead of performing subsequent processing on the code. When the source of the annotations is untrusted by the second computer system, the second computer system can use a checker to verify the integrity of the annotations.

16 Claims, 3 Drawing Sheets

METHOD AND APPARATUS FOR ANNOTATING A COMPUTER PROGRAM TO FACILITATE SUBSEQUENT PROCESSING OF THE PROGRAM

FIELD OF THE INVENTION

This invention relates generally to the processing of mobile, computer programs, and more particularly to annotating such programs to assist downstream processing phases.

BACKGROUND

In computer systems, and particularly in networked computer systems, computers commonly acquire programs to execute from other computers. Before executing an acquired program, the acquiring computer typically performs processing on the program. For example, the computer may compile the program into machine language native to that computer. As another example, the computer may verify that the program satisfies certain security constraints. This verification is particularly important because, generally, the computer distrusts the acquired program; the security checks ensure that the program does not tamper with files and other resources of the computer.

FIG. 1 illustrates a typical prior art network 100 in which a first computer 110 uses a program processing tool 112 to verify and compile a program downloaded from a second computer 120. The program downloaded from the second computer 120 is in an intermediate form 130 that represents the program. The second computer 120 used an intermediate code generator 150 to generate the intermediate form 130 from source code 140 of the program. At the first computer 110, the processing tool 112 analyzes the code 130 to determine whether the code 130 is safe to compile and execute. The tool 112 also performs code optimization techniques to produce executable machine code 160 native to the first computer 110.

Security checks and compiler analyses consume system time and, as a result, can reduce performance. These analyses can also be ineffective because of insufficient information to perform a proper security check or insufficient time to thoroughly process available information.

Security checks, for example, may err on the side of caution and reject secure code because the information necessary to prove that the code is secure is lacking. Moreover, a security check itself may be a source of vulnerability because it is incorrectly designed or improperly implemented. Unwittingly, this security check may leave open doors for attack. Also, some compilers, such as just-in-time compilers, may not have sufficient time to perform thorough analysis for optimization. Without enough time for optimization, the machine code may perform poorly.

As a result, a need remains for a method and an apparatus that facilitate security checks and code analyses. Such a method and apparatus can lead to improved accuracy of the security checks and to machine code that performs better than what can currently be generated.

SUMMARY

In accordance with the present invention, an objective is to enhance program code, such as mobile code, with supplementary information that will help subsequent processing stages. Having such information available during subsequent processing stages will, for example, lead to more accurate determinations of the security of the code and to improved performances of generated machine code.

A method performed according to the principles of the invention achieves the aforementioned and other objectives when processing intermediate code generated at a first computer system by generating annotations for the code. The annotations provide information about the intermediate code that can be used to process the code. A second computer system receiving the code and the annotations can then process the code according to the information provided by the annotations.

The annotations, in general, provide information that is useful to the second computer system for processing the code. For example, the annotations can be a control flow graph that represents an execution flow of the code. Also, the annotations can provide a register allocation that maps the data structures of the code to machine registers of the second computer system. Other annotations can provide method offsets. Such information provided by the annotations can be useful to the second computer system, for example, when interpreting or compiling the code. As yet another example, the annotations can indicate whether running the code would perform unauthorized operations on the second computer system.

These annotations can be generated at a number of locations in a network before being transmitted to the second computer system. For example, the first computer system that produced the code can also produce the annotations and send both the code and the annotations to the receiving computer system. The first computer system may produce the code and the annotations concurrently or produce the annotations after the code has been generated. Also, the first computer system may add the annotations to the code and send both together to the second computer system, or store the annotations separately from the code and transmit the annotations and code separately. In still another example, a third computer system between the first and second computer systems, for example, a computer on a firewall protecting the second computer system from receiving potentially harmful programs, can generate and transmit the annotations to the second computer system.

Just as code from the first computer cannot always be trusted, downloaded annotations should also not be trusted unless a trusted system, such as the aforementioned third computer system on the firewall, generated the annotations. When the annotations come from an untrusted system, the second computer system must check the correctness of the annotations that the second computer system uses. Checking the analysis provided by the annotations, however, is often faster and simpler than performing the analysis, so the invention still improves the performance and reduces the vulnerability of the second computer system.

In terms of the disclosed apparatus, the invention comprises a first computer system and a second computer system coupled to each other by a network. The second computer system requests a computer program from the first computer system. An annotator generates an annotation for the program. The annotation provides information about the program that characterizes the program. The second computer system receives the code and the annotation and processes the code according to the information provided by the annotation.

DETAILED DESCRIPTION OF THE PREFERRED EMBODIMENT

Figure 2:
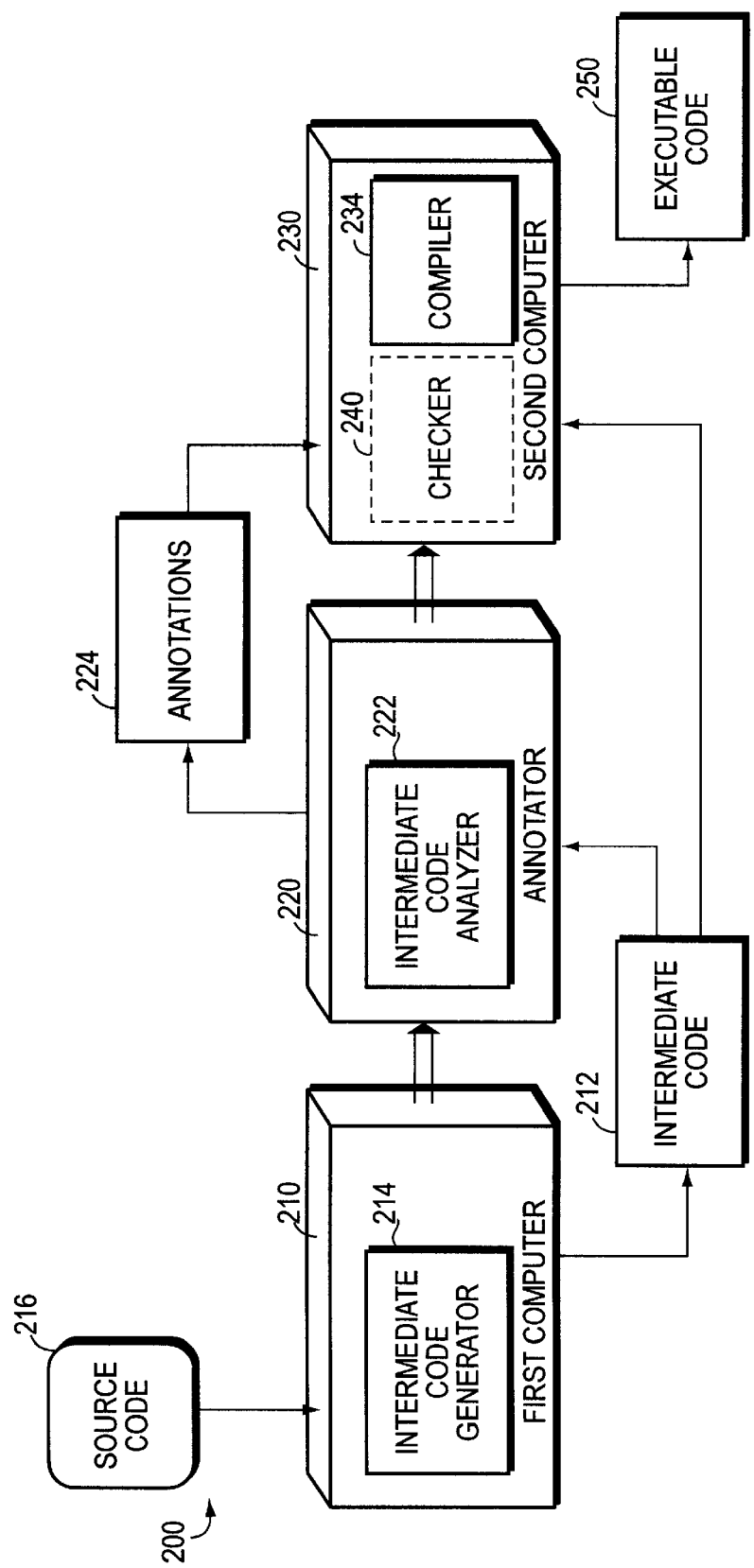
FIG. 2 is another more detailed block diagram schematic of an embodiment of the present invention.

FIG. 2 shows an exemplary networked computer system 200 including a program annotator 220 coupled to a first computer 210 and a second computer 230. For purposes of illustration, the user of the second computer 230 does not trust the first computer 210 or any code coming from the first computer 210. This means that the user of the second computer 230 does not know whether an executable form of the code 212 will perform any unauthorized operations, such as accessing files and directories of the second computer 230. Accordingly, the user of the code 212 should verify the integrity of untrusted code before executing it. The first computer 210 includes an intermediate code generator 214 that converts source code 216 of a computer program into an intermediate code 212. The source code 216 can be written in any programming language, such as Java, C or C++, but the intermediate code generator 214 must be able to process the semantics and syntax of that programming language in order to produce the intermediate code 212. The intermediate code 212 produced by the generator 214 is machine-independent, that is, the code 212 itself does not run on any particular computer without further processing, e.g., interpreting or compiling. It is to be understood that the practice of the principles of the invention is not limited to intermediate code, but rather that annotations can be generated for various other types of code, such as, for example, source code, machine code, machine-dependent or machine-independent code, high-level or low-level code, assembly code, etc.

The annotator 220 includes an intermediate code analyzer 222 that analyzes the intermediate code 212 from the first computer 210 and produces annotations 224 as a result. This analysis can include, for example, mapping variables to registers, determining a control flow of the code 212, determining methods for optimizing the code 212, checking that all data structures are initialized and that the code 212 is syntactically well-formed, contains valid references to data structures, data fields, and other code, and verifying that operations performed by the code 212 do not underflow or overflow the stack. These examples are simply illustrative.

Figure 1:
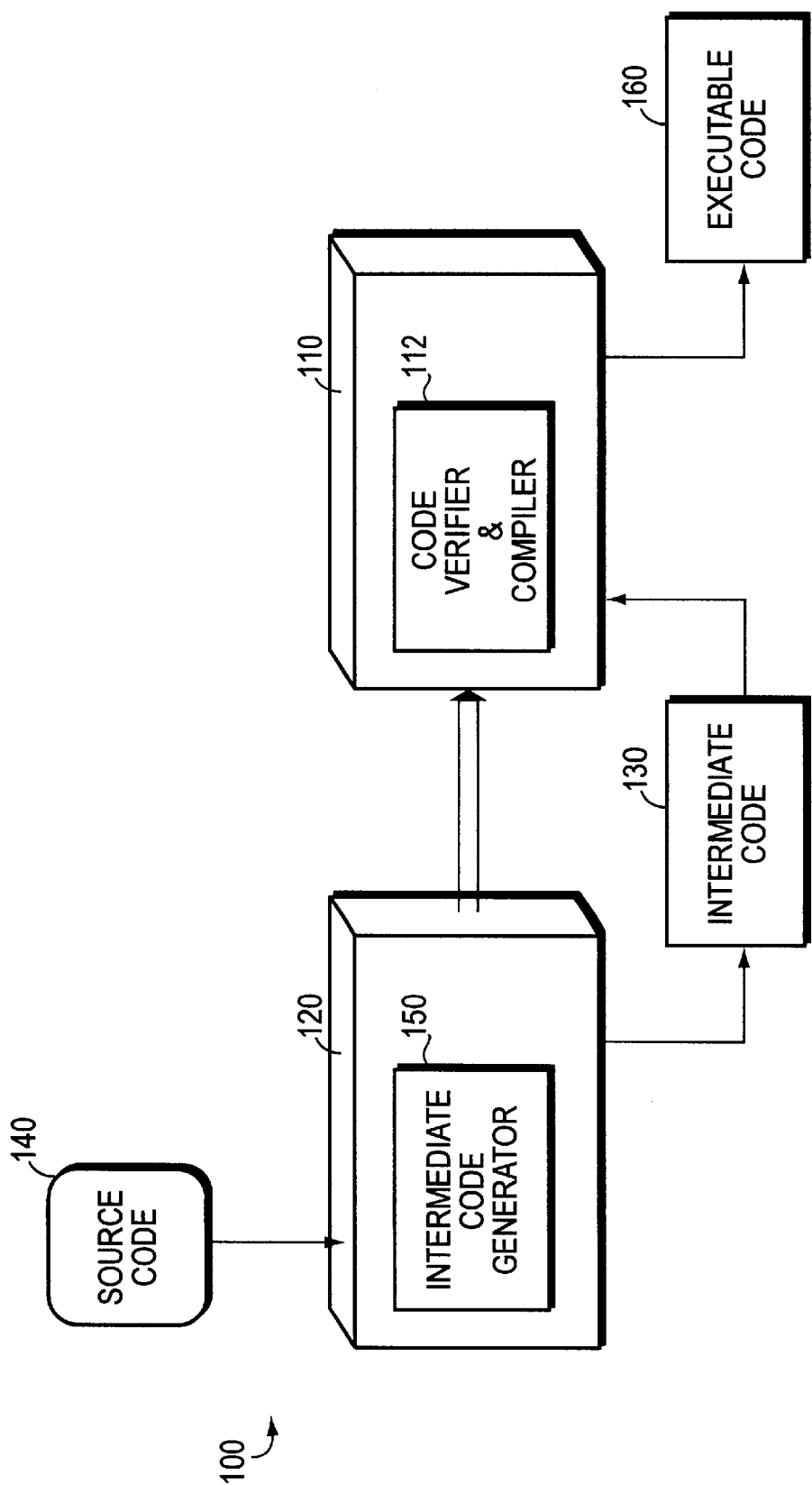
FIG. 1 is a block diagram schematic of an embodiment of the present invention.

From the annotator 220, the intermediate code 212 and the annotations 224 pass to the second computer 230. Although shown in FIG. 1 to be separately forwarded to the second computer 230, the intermediate code analyzer 222 can annotate the code 212 so that the annotations 224 are placed in the code 212, producing an annotated intermediate code. As a result, the code 212 and the annotations 224 arrive concurrently at the second computer 230.

Placing the annotations 224 in the code 212 displaces the need for locally caching the analysis. Before the present invention, each user of the intermediate code 212 would store the analysis performed on the code 212 for subsequent use. This way, the computer would not have to repeat the analysis each time the intermediate code 212 was downloaded. With local caching, however, only the computer with the cached analysis benefited from that analysis. Using the present invention, the analysis that is recorded by the annotations 224 in the intermediate code 212 can benefit any user with access to the annotated intermediate code.

The annotator 220 can reside at the first computer 210 or at a third computer (not shown) connected to both the first and second computers 210, 230. Conceivably, the annotator 220 could reside at the second computer 230, but the benefits of annotating are greater when the intermediate code 212 arrives at the second computer 230 already annotated.

Normally, it would be easier to annotate the intermediate code 212 at the same computer where the intermediate code 212 is produced because of the availability of the original source code 216. For example, when the annotator 224 resides at the first computer system 210, the code and the annotations 224 can be produced concurrently, or the annotations 224 can be produced after the code has been generated. Having the annotator 220 reside at the first computer 210, therefore, produces advantages. On the other hand, the annotations 224 produced by the first computer 210 are untrusted because the first computer 210 is untrusted. Thus, the second computer 230 should verify the integrity of the annotations 224.

For this purpose, the second computer 230 has a checker 240 for verifying the integrity of the annotations 224. Because it is often faster and simpler to check annotations than to produce annotations, the advantages of annotating at an untrusted system remain. The checker 240 can immediately reject the code 212 when the checker 240 determines that the annotations 224 are invalid. Invalid annotations 224 include those annotations that present a false representation of the operation of the code 212 or perform operations that are unauthorized by the second computer 230 or are not well-formed, i.e., fail to follow a particular format. Conversely, valid annotations 224 are well-formed and accurately reflect the operation of the code 212. The checker 240, then, can quickly conclude from the annotations 224 whether the intermediate code 212 should be subsequently processed, e.g., interpreted or compiled.

The dashed lines in FIG. 2 indicate that the second computer 230 may not need a checker 240 when the annotations 224 come from a trusted source. An example of a trusted source is a third computer (not shown) at a firewall between the first computer 210 and the second computer 230, protecting the second computer 230 from harmful programs. The annotator 220 can reside at this third computer and produce annotations 224 that are trusted by the second computer 230.

The second computer 230 includes a compiler 234 for transforming the intermediate code 212 into executable machine code 250. The machine code 250 is dependent on the microprocessor running the second computer 230. The compiler 234 has added capabilities for handling the format of the annotations 224 and for using the annotations 224 as guidance during construction of the machine code 250. For example, the additional capabilities of the compiler 234 include analyzing the annotations 224 and rejecting the intermediate code 212 when the annotations 224 indicate that the code 212 is not secure. The compiler 234 can also reference the annotations 224 to optimize the machine code 250. Alternatively, the second computer 230 can include an interpreter capable of using the annotations to determine whether to execute the intermediate code 212 and then for guidance during any subsequent code execution.

ANNOTATIONS

In general, the annotations 224 produced by the analyzer 222 include any information about the code 212 that can be obtained from static analysis. This information facilitates subsequent processing of the code 212. The annotations 224 that provide information about the code 212 are various and fall into at least two types: annotations that characterize properties of the code; and annotations that are in the form of a formal proof of the code. This categorizing of annotations is not intended to be exhaustive, but rather to distinguish annotations that characterize properties of the code from annotations that are a proof of the code.

The first type of annotations 224, those that characterize properties of the code 212, provide the second computer 230 with information that assists in a wide variety of subsequent processing of that code 212. Such subsequent processing includes determining whether the code is safe for additional subsequent processing, such as executing machine code, or interpreting or compiling intermediate code. For example, when the code 212 is in machine code form, this type of annotations 224 contains information about how the code accesses memory, allowing the second computer 230 to conclude that this machine code is safe to execute, or such annotations 224 can contain information about what registers are live at different program points, allowing the code to be optimized for increased performance. Alternatively, when the code 212 is in an intermediate code form, the annotations can provide useful information for optimally interpreting the intermediate code or transforming the intermediate code into an executable form.

The information provided by these annotations can range from a detailed description of a particular property of the code to a broad, overall perspective of the entire code 212. For instance, exemplary annotations can characterize the behavior of a single code statement, a block of code statements, or the flow of execution of the entire code 212. The following examples are illustrative of the diversity and uses of annotations that characterize properties of the code. Any one or all of these exemplary annotations may be generated for the code 212 and used by the second computer 230 as aid in the subsequent processing of the code 212.

Exemplary annotations 224 of the first type can indicate what variables are used in the code 212 and the types of values stored in those variables. The particular annotation for the code statement

"$X_1:=0$", for example, can be $\{X_1: \text{integer}, X_2: \text{undefined}\}$, where $X_1$ and $X_2$ are the two variables used by the intermediate code 212. This particular exemplary annotation indicates that at this point in the code 212, the variable $X_1$ holds a data structure of an integer type, while the type of the data structure in $X_2$ is undefined. Such annotations 224, for example, can simplify and accelerate for the second computer 230 the task of type-checking data structures of the code 212 to determine whether the intermediate code 212 is secure for subsequent execution. Thus, the second computer 230 can determine beforehand that run-time checks of the intermediate code 212 are unnecessary. As another exemplary use of such annotations, the information about the data types can assist run-time optimization by enabling tag-less garbage collection.

Another exemplary annotation 224 is a control flow graph that represents the flow of execution of the entire code 212. Some exemplary annotations 224 can be less encompassing and represent the behavior of blocks of code statements. Such annotations 224 for blocks of statements can be placed at a block entry point, at an exit point, or at both points.

Other annotations 224 can map data structures to machine registers of the second computer 230. The mapping of data structures to machine registers can help optimize machine code 250 through efficient use of the machine registers. This register allocation can benefit just-in-time compilers that commonly make sub-optimal use of the registers because of the limited time in which to analyze intermediate code 212.

Still other annotations 224 that characterize the code 212 can provide method offsets. Method offsets direct the compiler 234 to locations within an object where the compiler 234 can find particular methods. These annotations can help the compiler 234 avoid clashes in method offsets in situations of multiple inheritance. Still others 224 may show when a level of indirection can be removed from a data structure.

Annotations of the second type provide a formal proof of some property of the code. The formal proof uses formal logic reasoning about the code. The proof assures that the code will behave according to a prescribed policy when that proof is validated. An example of the second type of annotations is described by George Necula in "Proof-Carrying Code", 1997, incorporated by reference herein. There, a compiler adds a formal proof to native binary code while the compiler produces the binary code. When the proof is validated, the binary code is deemed safe to execute.

Annotations of the second type can be used to practice the principles of the present invention. A proof provided by such annotations can be used to determine whether code should be subsequently executed, i.e., compiled or interpreted. When the proof is validated, annotations of the previously-mentioned first type can then be used to guide such subsequent execution. In general, to produce annotations, the analyzer 222 statically analyzes the intermediate code 212 like a conventional compiler. Off-loading the analyses to the analyzer 222 allows the second computer 230 to more quickly and more effectively process the intermediate code (e.g., produce better machine code 250) than if the second computer 230 had to perform its own analyses. This is because the annotator 220 may have more time than the second computer 230 to produce a more thorough analysis. Also, the annotator 220 may have access to available source code 216, whereas such information may not be available to the second computer 230.

Figure 3:
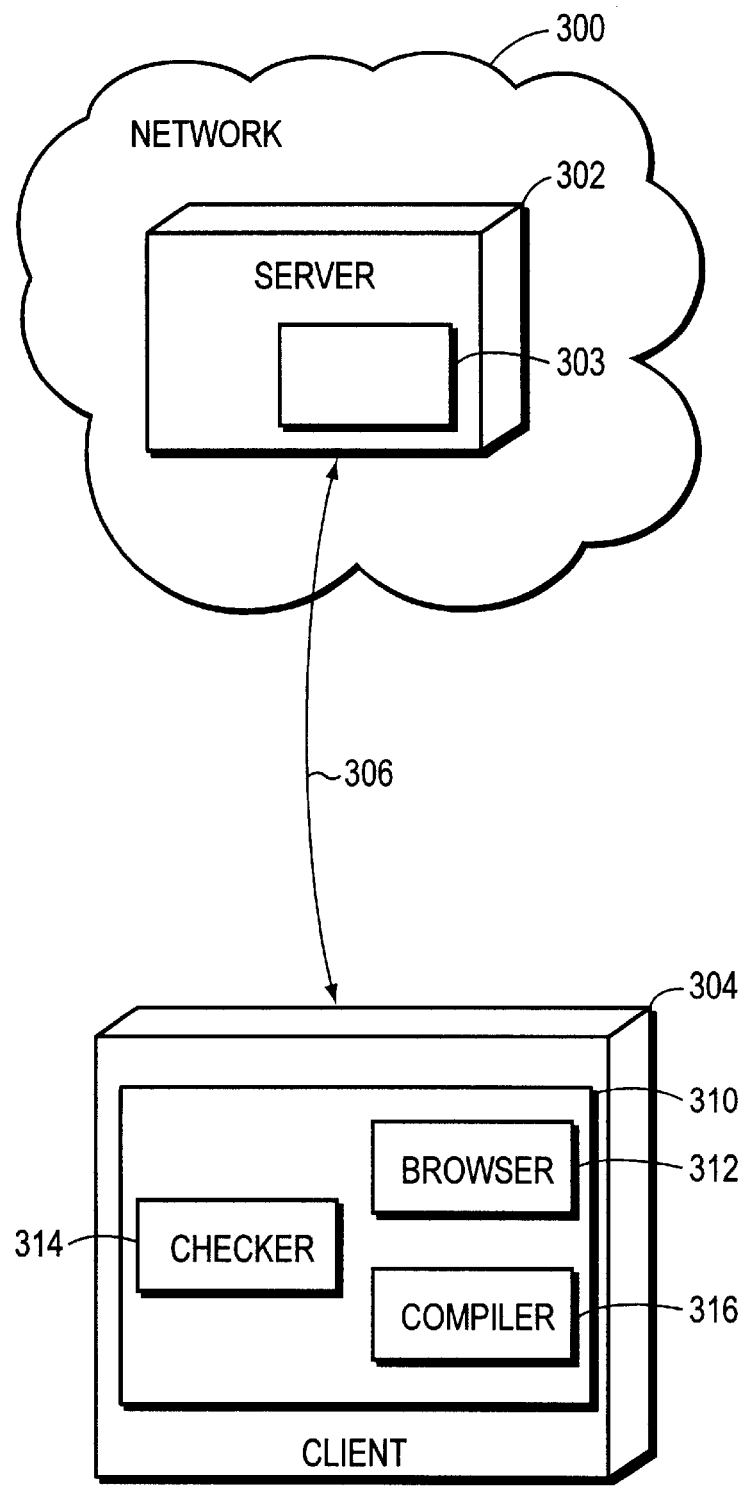
FIG. 3 is a block diagram of an exemplary application of the present invention

FIG. 3 illustrates an exemplary application using the principles of the present invention to process a computer program. A communication network 300 connects a server 302 in the network 300 with a client computer 304 by network link 306. An example of such a network 300 is the Internet. The server 302 supports a web page; that is, the server 302 maintains documents, pages and other forms of data for retrieval. Applets, which are small programs compiled to an intermediate form, might be attached to the web page when the web page is retrieved.

The server 302 includes an annotator 303 that statically analyzes and annotates, according to the principles of the invention, each applet attached to the web page. That the annotator 303 statically analyzes the applet before the applet is sent to the client 304 distinguishes the present invention from known techniques, such as a Java™ virtual machine, that analyze the applet at the client 304.

The client 304 includes memory 310 for storing a browser 312, an annotation checker 314, and a compiler 316. The memory 310 can include a hard disk and main memory. The browser 312 provides a user of the client 306 with an interface that simplifies access to the server 302. Examples of a browser are Netscape Communicator™ and Microsoft Internet Explorers™.

During an execution of the browser 312, the client 304 can request access to the web page on the server 302. The browser 312 issues the request to the server by the link 306.

In response to the request, the server 302 returns the data associated with the requested web page to the client 304. When the retrieved web page is accompanied by an attached applet, the server 302 sends the annotated intermediate code representing the applet to the client 304.

When the server 302 is trusted by the client 304, the client 304 can process the annotated intermediate code according to the annotations embedded in the code without having to verify the annotations. This processing can include checking the safety of the applet and executing the applet. As used in this context, "executing" means interpreting or compiling. For example, the annotations may provide typing of the variables in the code from which the browser can determine whether the applet is safe to execute on the client 304. As another example, the annotations can suggest register allocations, for example, that help the browser execute the applet through efficient use of machine registers of the client 304.

Typically, however, the client 304 does not trust the applet produced by the server 302. In this event, the client 304 would analyze the annotations along with the applet to make sure that the applet would not perform any unwanted operations when the applet runs on the client 304. The checker 314 accordingly verifies the integrity of the annotations in the applet code. The browser 312 rejects the applet when the checker 314 determines that the annotations are false. On the other hand, when the checker 314 determines that the annotations are valid, the browser 312 can process the applet, as previously noted, according to the annotations in the applet code.

Although described within the context of the Internet and web browsers, the invention can be practiced within any other context where programs are annotated to facilitate subsequent program processing stages. The foregoing description has been directed to specific embodiments of this invention. It will be apparent, however, that variations and modifications may be made to the described embodiments, with the attainment of all or some of the advantages. It is the object of the appended claims, therefore, to cover all such variations and modifications as come within the spirit and scope of the invention.

What is claimed is:

1. A computerized method for processing code representing a computer program, the code being generated at a first computer system, the method comprising the steps of:

generating an annotation for the code that characterizes at least one property of the code;

analyzing the annotation, at a second computer system, to determine whether the code can safely operate at the second computer system and to provide information for optimizing the code's operating performance; and transforming and optimizing the code into an executable code in the second computer according to the information contained in the annotation if the analysis indicates that the code can be safely operated.

2. The method of claim 1 further comprises interpreting the code according to the information provided by the annotation.

3. The method of claim 1 wherein the annotation includes information on register allocation that maps data structures of the code to registers of the second computer system.

4. The method of claim 1 wherein the annotation includes information on a control flow graph representing a flow of execution of the code.

5. The method of claim 1 wherein the annotation includes information on a method offset.

6. The method of claim 1 wherein the annotation indicates data types of variables in the code.

7. The method of claim 1, further comprising the step of:

verifying at the second computer system that the annotation is valid.

8. The method of claim 1 wherein the generating of the annotation occurs at the first computer system.

9. The method of claim 1 wherein the generating of the annotation occurs at a third computer system.

10. The method of claim 1, further comprising the step of:

adding the annotation to the code to produce annotated code; and sending the annotated code to the second computer system.

11. The method of claim 1 wherein the code is intermediate code requiring processing before the code can operate at the second computer system.

12. The method of claim 1, further comprising the steps of determining from the information provided by the annotations whether the code can be trusted to operate at the second computer system and operating the code only if the code can be trusted.

13. The method of claim 1 wherein the code is trusted to operate at the second computer system when the annotations are generated at a trusted computer system.

14. The method of claim 1 wherein determining whether the code should be processed includes determining whether running an executable form of the code would perform an unauthorized operation at the second computer system.

15. An apparatus for processing a computer program, comprising:

a first computer system and a second computer system coupled to each other by a network, the second computer system requesting a computer program from the first computer system;

an annotator, coupled to receive the program, generating an annotation for the program, the annotation characterizing at least e property of the program; and the second computer receiving the code and the annotation, the second computer analyzing the annotation to determine whether the code can safely operate at the second computer system and provide information for optimizing the code's operating performance, and if the analysis indicates that the code can be safely operated, the second computer system transforming and optimizing the code into an executable code in the second computer according to the information contained in the annotation.

16. A system for processing a computer program, the system comprising:

a first computer system and a second computer system coupled to each other by a network, the first computer system comprising a means for generating code;

means for generating an annotation for the code, the annotation providing information that characterizes at least one property of the code;

means for analyzing the annotation, at the second computer system, to determine whether the code can safely operate at the second computer system and to provide information for optimizing the code's operating performance; and means for transforming and optimizing the code into an executable code in the second computer according to the information contained in the annotation if the analysis indicates that the code can be safely operated.

* * * * *